(12) United States Patent
Song et al.

(10) Patent No.: US 11,604,506 B2
(45) Date of Patent: Mar. 14, 2023

(54) METHOD FOR REDUCING POWER CONSUMPTION OF ELECTRONIC DEVICE, AND APPARATUS

(71) Applicant: Huawei Technologies Co., Ltd., Shenzhen (CN)

(72) Inventors: Yanfei Song, Xi'an (CN); Bitao Ou, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 376 days.

(21) Appl. No.: 16/480,872

(22) PCT Filed: Jan. 25, 2017

(86) PCT No.: PCT/CN2017/072668
§ 371 (c)(1),
(2) Date: Jul. 25, 2019

(87) PCT Pub. No.: WO2018/137197
PCT Pub. Date: Aug. 2, 2018

(65) Prior Publication Data
US 2019/0346905 A1 Nov. 14, 2019

(51) Int. Cl.
*G06F 1/3246* (2019.01)
*G06F 1/20* (2006.01)
(Continued)

(52) U.S. Cl.
CPC ............ *G06F 1/3246* (2013.01); *G06F 1/206* (2013.01); *G06F 1/3287* (2013.01); *H04W 52/0225* (2013.01); *H04W 52/0274* (2013.01)

(58) Field of Classification Search
CPC ...... G06F 1/3246; G06F 1/206; G06F 1/3287; H04W 52/0225; H04W 52/0274
See application file for complete search history.

(56) References Cited

U.S. PATENT DOCUMENTS 6,631,474 B1   10/2003   Cai et al.
8,806,246 B1 *  8/2014   Wu .................... G06F 9/4893
                                                                709/224
(Continued)

FOREIGN PATENT DOCUMENTS

CN    101598968 A    12/2009
CN    102625421 A     8/2012
(Continued)

OTHER PUBLICATIONS

Machine Translation of JP-2006196934 A (2006-196934). (Year: 2006).*
(Continued)

*Primary Examiner* — Nimesh G Patel
(74) *Attorney, Agent, or Firm* — Conley Rose, P.C.

(57) ABSTRACT

An electronic device supporting power consumption reduction can be operated in a power saving mode or in an active mode, and the electronic device includes a first processor and a second processor. The first processor is configured to be powered off when the electronic device is in the power saving mode. The second processor is configured to, when the electronic device is in the power saving mode, control peripheral hardware associated with a local bus of the first processor. The peripheral hardware includes at least one of the following: a display unit, an input unit, a BLUETOOTH unit, and a sensing unit.

20 Claims, 9 Drawing Sheets

(51) Int. Cl.
*G06F 1/3287* (2019.01)
*H04W 52/02* (2009.01)

(56) References Cited

U.S. PATENT DOCUMENTS

| | | | |
|---|---|---|---|
| 8,904,206 B2 * | 12/2014 | Black | H04W 52/0258 713/320 |
| 10,262,155 B1 * | 4/2019 | Sun | G06F 21/629 |
| 2002/0082059 A1 * | 6/2002 | Nariai | H04W 52/0264 455/573 |
| 2007/0077964 A1 * | 4/2007 | Llanos | H04W 88/06 455/557 |
| 2007/0094519 A1 | 4/2007 | Yamamoto | |
| 2008/0298528 A1 | 12/2008 | Fukushima | |
| 2009/0221240 A1 | 9/2009 | Zhang | |
| 2009/0282278 A1 | 11/2009 | Satoh | |
| 2010/0082414 A1 * | 4/2010 | Shimaya | G06Q 30/0241 700/295 |
| 2011/0055434 A1 | 3/2011 | Pyers et al. | |
| 2011/0093729 A1 | 4/2011 | Mucignat et al. | |
| 2014/0013141 A1 * | 1/2014 | Heo | H04W 52/027 713/323 |
| 2014/0245041 A1 * | 8/2014 | Ayalur | G06F 1/3206 713/323 |
| 2014/0267316 A1 | 9/2014 | Connell et al. | |
| 2014/0342671 A1 * | 11/2014 | Kim | H04W 4/02 455/41.3 |
| 2014/0375273 A1 * | 12/2014 | Harada | G06F 1/263 320/136 |
| 2015/0277401 A1 | 10/2015 | Hsiao et al. | |
| 2015/0301588 A1 * | 10/2015 | Jeong | G06F 1/3203 713/323 |
| 2016/0063664 A1 | 3/2016 | Mizuno | |
| 2016/0337540 A1 * | 11/2016 | Fujisawa | H04N 1/33323 |
| 2017/0064629 A1 | 3/2017 | Tan et al. | |
| 2017/0123450 A1 * | 5/2017 | Mittelman | G06F 1/3231 |
| 2018/0259914 A1 * | 9/2018 | Chae | G04G 17/08 |
| 2019/0346905 A1 * | 11/2019 | Song | G06F 1/163 |

FOREIGN PATENT DOCUMENTS

| | | | | |
|---|---|---|---|---|
| CN | 103596252 A | | 2/2014 | |
| CN | 102713788 B | | 10/2014 | |
| CN | 104866064 A | | 8/2015 | |
| CN | 104951043 A | | 9/2015 | |
| CN | 105159675 A | | 12/2015 | |
| CN | 105892596 A | | 8/2016 | |
| CN | 106108848 A | | 11/2016 | |
| EP | 2683204 A1 | | 1/2014 | |
| JP | H01190222 A | | 7/1989 | |
| JP | 2006196934 A | * | 7/2006 | H04B 7/26 |
| JP | 2008299612 A | | 12/2008 | |
| JP | 2009294927 A | | 12/2009 | |
| JP | 2012034294 A | | 2/2012 | |
| JP | 2012203763 A | | 10/2012 | |
| JP | 2013086404 A | | 5/2013 | |
| JP | 2013107299 A | | 6/2013 | |
| JP | 2014089534 A | | 5/2014 | |
| JP | 2016053621 A | | 4/2016 | |
| JP | 2016181168 A | | 10/2016 | |
| WO | 2005038638 A1 | | 4/2005 | |
| WO | WO-2012073204 A2 | * | 6/2012 | G06F 9/4421 |
| WO | WO 2017/051976 A1 | * | 3/2017 | G04G 17/00 |

OTHER PUBLICATIONS

Machine Translation and Abstract of Chinese Publication No. CN102625421, Aug. 1, 2012, 20 pages.
Machine Translation and Abstract of Chinese Publication No. CN103596252, Feb. 19, 2014, 27 pages.
Foreign Communication From A Counterpart Application, PCT Application No. PCT/CN2017/072668, English Translation of International Search Report dated Oct. 26, 2017, 2 pages.
Foreign Communication From A Counterpart Application, PCT Application No. PCT/CN2017/072668, English Translation of Written Opinion dated Oct. 26, 2017, 4 pages.
Foreign Communication From A Counterpart Application, European Application No. 17893574.8, Extended European Search Report dated Nov. 11, 2019, 6 pages.

* cited by examiner

METHOD FOR REDUCING POWER CONSUMPTION OF ELECTRONIC DEVICE, AND APPARATUS

CROSS-REFERENCE TO RELATED APPLICATIONS

This application is a National Stage of International Patent Application No. PCT/CN2017/072668, filed on Jan. 25, 2017, which is hereby incorporated by reference in its entirety.

TECHNICAL FIELD

Embodiments of this application relate to the field of communications technologies, and more specifically, to a technology for reducing power consumption of an electronic device.

BACKGROUND

As wearable devices spring up, a smartwatch has become an important member of wearable electronic devices. In addition to being capable of indicating time, an existing smartwatch has functions such as a notification reminder, navigation, motion recording, and health monitoring.

An important design limitation of a current smartwatch is an endurance capability. Due to consumption of electricity of a device and a limitation of a battery capability, a majority of smartwatches need to be charged every day or every other day. Consequently, many cases occur. In these cases, when a battery electricity quantity reaches a used-up level, a user can no longer use basic functions, such as timing, receiving a notification reminder, navigation, motion recording, and health monitoring. This causes much inconvenience to the user.

In conclusion, currently, a solution is urgently needed to precisely reduce power consumption of a smart electronic device while ensuring user experience.

SUMMARY

This specification describes a method for reducing power consumption of an electronic device, and an apparatus, to improve an endurance capability of the electronic device.

According to a first aspect, an embodiment of this application provides an electronic device. The electronic device can be operated in a power saving mode or in an active mode, and the electronic device includes a first processor and a second processor. The first processor is configured to be powered off when the electronic device is in the power saving mode. The second processor is configured to: when the electronic device is in the power saving mode, control peripheral hardware associated with a local bus of the first processor. The peripheral hardware includes at least one of the following: a display unit, an input unit, a Bluetooth unit, and a sensing unit.

The first processor (such as a central processing unit (CPU) or an application processor (AP)) of the electronic device is responsible for running an operating system (such as an operating system of a smartwatch) and various application programs. The second processor (such as a low-power processor, a low-power microprocessor (MPU), or an MCU) of the electronic device is responsible for controlling the sensing unit (the sensing unit is responsible for recording a motion event, such as a walking event or a wobbling event) of the electronic device. Power is usually supplied to the electronic device by using a battery, and a battery electricity quantity is limited. However, running the operating system and running an application program in a background consume electricity of the electronic device.

The electronic device disconnects, in the power saving mode, power transmission of the first processor, and controls some necessary peripheral hardware (such as a display screen, the input unit (such as a power button), the Bluetooth unit, and the sensing unit) by using the second processor (such as the low-power processor, the low-power microprocessor (MPU), or the MCU) as a controller, so that power consumption of the application processor can be effectively reduced, and an endurance time of the electronic device can be increased. In addition, a basic function of the electronic device is ensured. For example, time and step quantity information may be displayed in the power saving mode, Bluetooth communication with another device (such as a mobile phone) can also be maintained by using the Bluetooth unit, an operation such as a restart or power-off operation may be performed by using the input unit (such as the power button), and a screen may be lit up by raising a wrist in the power saving mode.

In a possible design, the first processor is configured to: when the electronic device is in the active mode, control, by using a mobile industry processor interface (MIPI), the display unit associated with the local bus of the first processor.

In a possible design, the second processor is configured to: when the electronic device is in the power saving mode, control, by using a serial peripheral interface (SPI), the display unit associated with the local bus of the first processor.

When the electronic device works in the active mode, a data volume of content that needs to be displayed is relatively large. When the content displayed on the screen changes, a series of refresh actions need to be performed on the electronic device to display a smooth animation on the screen. Displayed data may be transmitted at a high speed in the active mode by using the mobile industry processor interface (MIPI).

When the electronic device works in the power saving mode, relatively little content needs to be displayed, and only a virtual watch face, the time, and the step quantity information usually need to be displayed. A display requirement can be met by using the serial peripheral interface (SPI), so that system consumption is reduced.

In a possible design, the first processor is configured to: when the electronic device is in the power saving mode and is charged by using a power adapter, the first processor is powered on and switches the electronic device to the active mode.

In a possible design, the second processor is configured to: when the electronic device is in the power saving mode, control to enable backlight of the display unit of the electronic device if a wrist raising action of a user of the electronic device is detected.

When the electronic device is in the power saving mode, the second processor controls the display unit and the sensing unit (which is configured to sense motion and health data of the user). Therefore, the electronic device in the power saving mode may still support lighting up a screen by raising a wrist, so that user experience is improved.

In a possible design, the second processor is configured to control, in one of the following cases, the peripheral hardware associated with the local bus of the first processor: a battery electricity quantity of the electronic device reaches a battery electricity quantity threshold; a temperature of the electronic device reaches a specified temperature threshold; and the electronic device receives a setting instruction entered by the user to enable the power saving mode.

In a possible design, the first processor is configured to: when the electronic device is charged by using the power adapter, prohibit the first processor from entering the power saving mode.

When the electronic device is charged by using the power adapter, a "power saving mode" button displayed by the display unit is in a prohibited state, to be specific, the icon button corresponding to the "power saving mode" is in a grayed state, so that the user is prohibited from selecting a "power saving mode" option.

When the battery is charged by using an external source, the electronic device is prohibited from entering the power saving mode, and the electronic device in the active mode may execute various functions (such as a calling function and a function of receiving a notification message from another electronic device (such as a mobile phone) by using Bluetooth), thereby preventing the user from missing a relatively important incoming call and notification message during charging.

In another possible design, the first processor is configured to: when the electronic device is charged by using the power adapter, if the setting instruction (pressing a physical button for 3 seconds, or taping an icon button of the power saving mode) for the user to enable the power saving mode is received, control the display unit to display a prompt box to inform the user that the power saving mode cannot be entered currently.

According to a second aspect, an embodiment of this application provides a method for reducing power consumption of an electronic device. The electronic device includes a first processor (such as a central processing unit (CPU) or an application processor (AP)) and a second processor (such as a low-power processor, a low-power microprocessor (MPU), or an MCU). The electronic device can be operated in a power saving mode or in an active mode. The method includes: operating the electronic device in the active mode; and when the electronic device is in the active mode, switching a mode of the electronic device from the active mode to the power saving mode in response to that occurrence of a first preset event is detected, where the electronic device is in the power saving mode, the first processor is powered off, the second processor controls peripheral hardware associated with a local bus of the first processor, and the peripheral hardware includes at least one of the following: a display unit, an input unit, a Bluetooth unit, and a sensing unit.

In a possible design, when the electronic device is operated in the power saving mode, backlight of the display unit is enabled if a wrist raising action of a user is detected.

When the electronic device is in the power saving mode, the display unit and the sensing unit are controlled by the second processor. The sensing unit monitors, based on motion data generated by a motion sensor, whether the user performs the wrist raising action. If the user performs the wrist raising action, the sensing unit reports the wrist raising action to the second processor, and the second processor controls to enable the backlight of the display unit. In this way, the electronic device in the power saving mode can also support lighting up a screen by raising a wrist, and the user conveniently checks time and health data (such as step quantity information).

In a possible design, when the electronic device is operated in the active mode, if the electronic device is attached to the user and the electronic device is charged by using a wireless power transmitter, the electronic device is prohibited from entering the power saving mode.

When the user charges the electronic device in a wireless charging manner, the user can complete charging without a need to take off the electronic device (in other words, the electronic device is still worn on a user's body). In this case, the electronic device is prohibited from entering the power saving mode, thereby preventing the user from missing a relatively important incoming call and notification message during charging.

In another possible design, when the electronic device is operated in the active mode, if the electronic device is attached to the user and the electronic device is charged by using a wireless power transmitter, a setting instruction (pressing a physical button for 3 seconds, or tapping an icon button of the power saving mode) for the user to enable the power saving mode is received, and a prompt box pops up to inform the user that the power saving mode cannot be entered currently.

In still another possible design, when the electronic device is operated in the active mode, if the electronic device is charged by using a power adapter (for example, the electronic device is charged by being connected to a charger in a wired manner or is charged in a wireless charging manner), the electronic device may be prohibited from entering the power saving mode. Alternatively, when a setting instruction for the user to enable the power saving mode is received, a prompt box pops up to inform the user that the power saving mode cannot be entered currently.

In a possible design, after the electronic device enters the power saving mode, the electronic device is restarted when the electronic device is charged by using a power adapter.

When the electronic device is charged by using the power adapter, the electronic device is restarted and is switched from the power saving mode to the active mode, thereby preventing the user from missing a relatively important incoming call and notification message during charging.

In a possible design, the first preset event includes at least one of the following: a battery electricity quantity of the electronic device reaches a battery electricity quantity threshold; a temperature of the electronic device reaches a specified temperature threshold; and the electronic device receives the setting instruction entered by the user to enable the power saving mode.

According to a third aspect, an embodiment of this application provides another method for reducing power consumption of an electronic device. The method includes: operating an electronic device in an active mode; and when the electronic device is in the active mode, switching the electronic device to a power saving mode in response to that occurrence of a first preset event is detected.

In a possible design, when the electronic device is in the power saving mode, backlight of a display unit is enabled when a wrist raising action of a user is detected.

In a possible design, when the electronic device is in the power saving mode, the electronic device is restarted if the electronic device is charged by using a power adapter.

In a possible design, when the electronic device is in the power saving mode, an instruction (for example, lighting up a screen by using a power button) for the user to enable a display unit is detected, and time and/or step quantity information are displayed by using the display unit.

In a possible design, when it is determined that the electronic device is in the active mode, the electronic device is attached to the user, and the electronic device is charged by using a wireless power transmitter, the electronic device is prohibited from entering the power saving mode.

In a possible design, the first preset event includes at least one of the following: a battery electricity quantity of the electronic device reaches a battery electricity quantity threshold; a temperature of the electronic device reaches a specified temperature threshold; and the electronic device receives a setting instruction entered by the user to enable the power saving mode.

According to a fourth aspect, an embodiment of the present invention provides another electronic device, where the electronic device has a function of implementing the third aspect and the possible designs of the third aspect. The function may be implemented by using hardware, or may be implemented by hardware by executing corresponding software. The hardware or software includes one or more modules corresponding to the foregoing function. The modules may be software and/or hardware.

Compared with the prior art, the solutions provided in this application may improve an endurance capability of an electronic device.

BRIEF DESCRIPTION OF DRAWINGS

To describe the technical solutions in the embodiments of this application more clearly, the following briefly describes the accompanying drawings required for describing the embodiments or the prior art. Apparently, the accompanying drawings in the following description show merely some embodiments of this application, and a person of ordinary skill in the art may still derive other drawings from these accompanying drawings without creative efforts.

DESCRIPTION OF EMBODIMENTS

The following clearly and completely describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

In descriptions of this application, it should be understood that terms "first", "second", "third", and the like are merely used for a description purpose, cannot be understood as representing a primary/secondary relationship, and therefore, cannot be understood as a limitation on this application.

An electronic device described in this specification may include a mobile phone, a smartphone, a laptop computer, a digital broadcast terminal, a personal digital assistant (PDA), a portable multimedia player (PMP), a GPS navigation system, and a wearable device (such as a smartwatch or a smart band). However, it is obvious for a person skilled in the art that, in addition to a portable terminal and the wearable device, a configuration according to the embodiments of this application may be further applied to a fixed terminal, such as a digital TV and a desktop computer.

Figure 1:
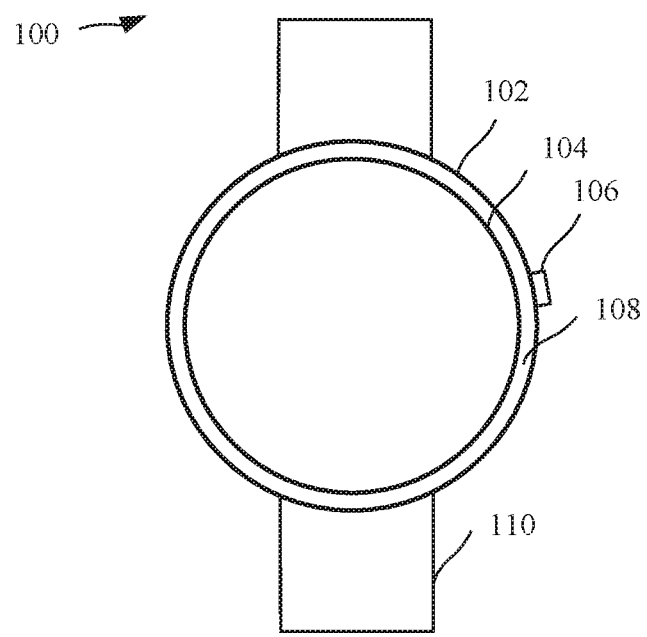
FIG. 1 is a schematic diagram of an electronic device according to an embodiment of this application.

FIG. 1 is a schematic diagram of an electronic device 100 according to an embodiment of this application. For example, the electronic device 100 is a wearable smartwatch. The electronic device 100 includes a main body 102, and the main body 102 includes all or some of a circuit, a fixed structure, and a display of the device 100. For example, the main body 102 may include all or some of a processing component, a data storage component, a memory, a sensor, and a cable layout or communications component of the device 100. In a specific embodiment, the device 100 may include the display. The display may use any proper form or shape, such as a circular shape. For example, the display is a circular display 104 shown in FIG. 1. In this specification, the "circular display" includes a display that is almost circular or a display in a shape like a circle, for example, an elliptical display. Optionally, the display 104 is a touch-sensitive display screen, namely, a touchscreen. Optionally, the display 104 may include one or more touch strength sensors configured to detect touch strength. The touch strength sensor optionally includes one or more piezoresistive strain gauges, capacitive force sensors, optical force sensors, or other strength sensors. The electronic device 100 may generate different visual feedback for different touch strength (such as touch force, touch pressure, or a substitution thereof).

In a specific embodiment, the electronic device 100 may include an input element 106 (such as a push button or a rotation button). In a specific embodiment, the electronic device 100 may include an element 108 surrounding the display. As used in this specification, the element 108 surrounding the display includes a rotatable element surrounding a main body of the display. In an example, the element 108 may be an outer ring 108 surrounding the circular display 104. In a specific embodiment, the element 108 surrounding the display may move relative to the display 104 or the main body. For example, the outer ring 108 may rotate in a clockwise or anticlockwise direction relative to the main body of the device 100. In a specific embodiment, the device 100 may include a watch band 110 attached to the main body 102.

Figure 2:
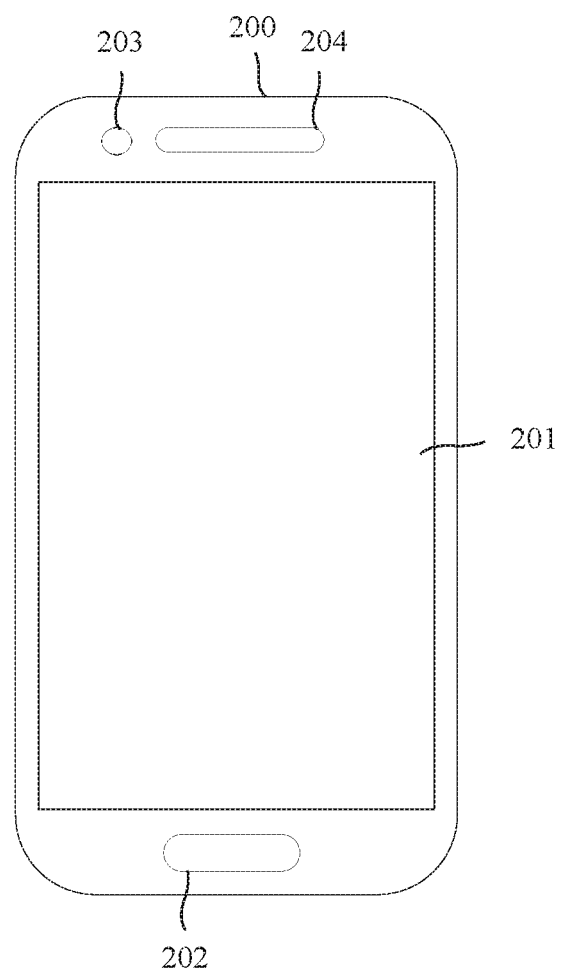
FIG. 2 is a schematic diagram of a portable electronic device according to another embodiment of this application.

FIG. 2 is a schematic diagram of a portable electronic device 200 according to another embodiment of this application.

Referring to FIG. 2, the electronic device 200 includes a touch-sensitive display screen 201, a fingerprint sensor 202, a camera 203, and a loudspeaker 204.

The fingerprint sensor 202 is usually disposed over, under, or beside a home button (home button) on the electronic device 200. In some embodiments, the fingerprint sensor 202 may be disposed on a side of a body of the electronic device 200, or may be disposed on a back of a body of the electronic device 200. This is not limited in this embodiment of this application.

The camera 203 includes a lens system, a drive unit, and an image sensor, and may further include a flash memory and the like. The camera 203 converts, into an electrical image signal or data, an optical signal entered (or captured) by using the lens system, and outputs the signal or data. A user may use the camera 16 to capture a moving image or a still image. In other words, the camera 203 forms an optical image of an object and detects the formed optical image as an electrical signal.

Optionally, the electronic device 200 further includes a microphone (not shown) and a memory (not shown). The microphone is configured to: receive voice or sound input and generate an electrical signal. The memory is configured to store a software program and/or an instruction set.

The touch-sensitive display screen 201 is sometimes referred to as a "touchscreen", and may be considered as or referred to as a touch-sensitive display system. The touchscreen is configured to: display an image, and generate a key touch interruption when a user input apparatus such as a finger or a stylus touches a surface of the touchscreen.

Figure 3:
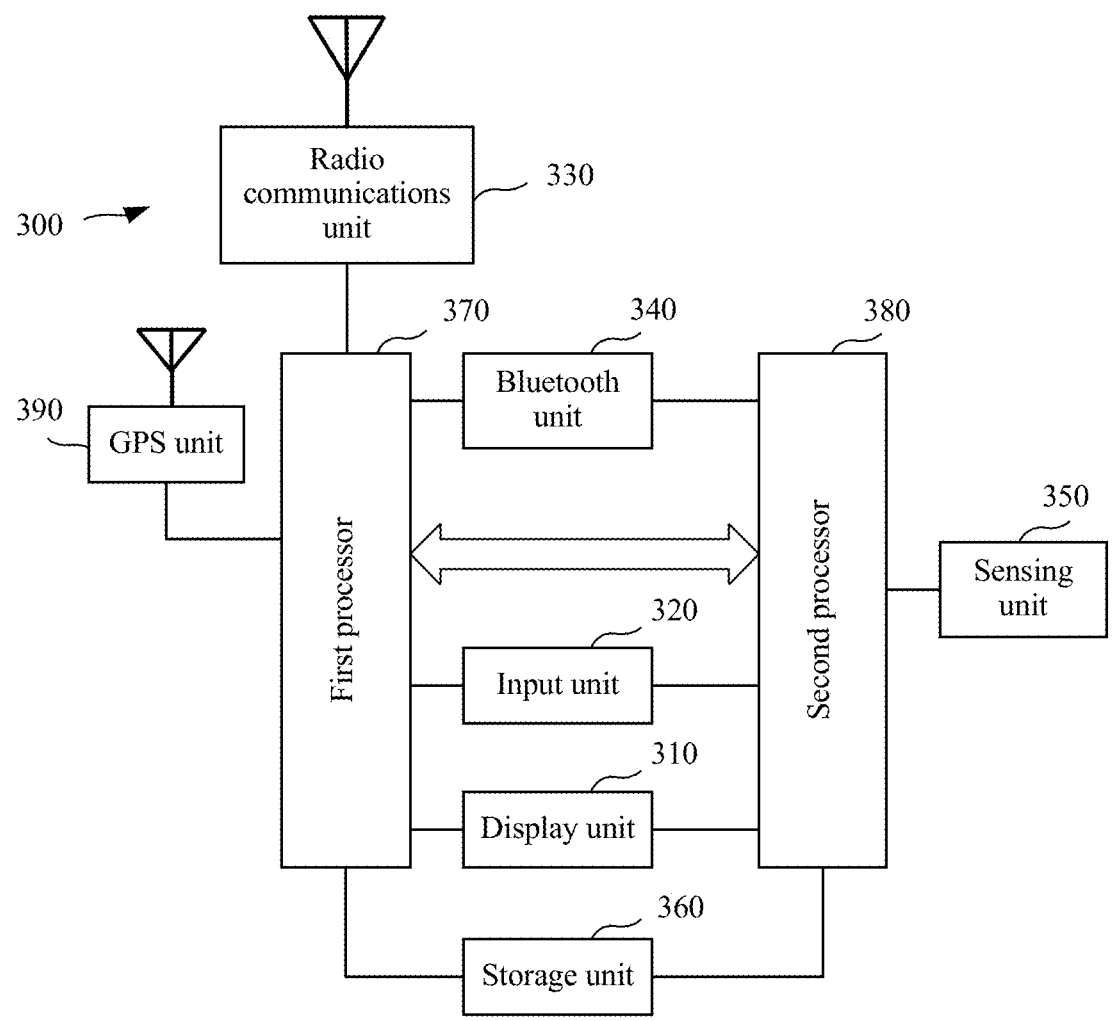
FIG. 3 is a block diagram of a configuration of an electronic device according to an embodiment of this application.

FIG. 3 is a block diagram of a configuration of an electronic device 300 according to an embodiment of this application. The electronic device 300 may be the wearable electronic device (the smartwatch) in FIG. 1, or may be the portable electronic device (the smartphone) in FIG. 2.

As shown in FIG. 3, the electronic device 300 includes a display unit 310, an input unit 320, a radio communications unit 330, a Bluetooth unit 340, a sensing unit 350, a storage unit 360, a first processor (which is also referred to as a primary processor) 370, a second processor (which is also referred to as a secondary processor) 380, and a Global Positioning System (GPS) unit 390.

The electronic device 300 can work in various power management modes (such as an active mode and a power saving mode), to save power in some cases. If the electronic device 300 is a smartwatch, the power saving mode of the electronic device 300 may also be referred to as a wristband mode. For example, the electronic device 300 may be configured to be switched from the active mode to the power saving mode when the electronic device 300 receives some instructions entered by a user. When the electronic device is switched to the power saving mode, the device may disable at least some components (such as the first processor 370, the radio communications unit 330, and the GPS unit 390). In some embodiments, when the electronic device 300 works in the power saving mode, the sensing unit 350 (such as a motion sensor) may keep at least some components enabled. In this way, the device may still detect some user motion events. In some embodiments, when the electronic device 300 works in the power saving mode, a unit that keeps working includes at least one of the following units: the display unit 310, the input unit 320, the Bluetooth unit 340, and the sensing unit 350. For example, in the power saving mode, the sensing unit 350 may be used as a pedometer for continuously detecting walking motion events of the user. The user may also learn of current time and current step quantity information by using the display unit 310.

The first processor 370 may be responsible for executing various software programs (such as an application program and an operating system), to provide calculation and processing operations used for the electronic device 300. The first processor 370 may be a central processing unit (CPU) or an application processor (AP). If the first processor 370 is requested to enter the power saving mode, the first processor 370 notifies the second processor 380 of a mode switching event (namely, an event of performing switching from the active mode to the power saving mode), and then enters the power saving mode. In an implementation, the first processor 370 is powered off when the electronic device is in the power saving mode.

The second processor 380 is mainly responsible for detecting data of the sensing unit 350. The second processor 380 includes any one of the following: a low-power processor, a low-power microprocessor (MPU), or an MCU. The second processor 380 runs proper software or a combination of a hardware element and a software element. The second processor 380 is configured to: when the electronic device is in the power saving mode, control peripheral hardware (such as the Bluetooth unit 340, the input unit 320, and the display unit 310) associated with a local bus of the first processor 370.

The display unit 310 is configured to display a graph, an image, or data to the user. The display unit 310 is configured to provide various screens associated with an operation of the electronic device 300. The display unit 310 provides a home screen, a message writing screen, a phone call screen, a game screen, a music playing screen, and a video playing screen. The display unit 310 may be implemented by using a flat display panel (such as a liquid crystal display (LCD), an organic light-emitting diode (OLED), and an active-matrix OLED (AMOLED)).

The display unit 310 is connected to the first processor 370 and the second processor 380. The first processor 370 and the display unit 310 may be configured to communicate with each other by using an interface such as (but is not limited to) the following: an RGB interface, an MDDI (mobile display digital interface), and an MIPI (mobile industry processor interface). The second processor 380 and the display unit 310 may be configured to communicate with each other by using an interface such as (hut is not limited to) the following: an SPI (serial peripheral interface) or an I2C (inter-integrated circuit). The first processor 370 and the display unit 310 are connected by using the MIPI, the MDDI, or the RGB, so that a requirement of the first processor 370 for the display unit 310 on a large data volume can be met. The second processor 380 and the display unit 310 are connected by using the SPI or the I2C interface, so that this solution is suitable for a power saving mode scenario with a relatively small volume of displayed data.

If the electronic device 300 is in the active mode, the first processor 370 directly communicates with the display unit 310, so that the first processor 370 controls the display unit 310. Otherwise, if the electronic device 300 is in the power saving mode, the second processor 380 directly communicates with the display unit 310, so that the second processor 380 controls the display unit 310.

When the display unit 310 is implemented in a form of a touchscreen, the display unit 310 may serve as an input apparatus for working. When the display unit 310 is implemented in the form of a touchscreen, the display unit 310 includes a touch panel configured to detect a touch gesture. The touch panel is configured to convert, into an electrical input signal, pressure exerted on a specific location of the display unit 310 or a capacitance change in a specific area of the display unit 310. The touch panel may be implemented in either an add-on (add-on) manner or an on-cell (or in-cell) manner.

The touch panel may be implemented as one of the following panels: a resistive touch panel, a capacitive touch panel, an electromagnetic induction touch panel, and a pressure-type touch panel. The touch panel is configured to detect touch pressure, a touched location, and a touched area. If a touch gesture is made on the touch panel, a corresponding input signal is generated to the first processor 370. Then, the first processor 370 checks touch input information of the user to execute a corresponding function.

The input unit 320 includes a module associated with input to the electronic device 300. The input unit 320 receives user input associated with a configuration and control of a function of the electronic device 300, and generates a corresponding input signal to the first processor 370. The input unit 320 may be implemented by using at least one of the following: a touch panel, a touchscreen, a common keyboard, a QWERTY keyboard, and a special function button (such as a power button or a volume button).

The input unit 320 is connected to the first processor 370 and the second processor 380. If the electronic device 300 is in the active mode, the first processor 370 directly communicates with the input unit 320. Otherwise, if the electronic device 300 is in the power saving mode, the second processor 380 directly communicates with the input unit 320. When the input unit 320 is implemented by using the special function button (such as the power button), if the electronic device 300 is in the power saving mode, the user may still light up a screen by pressing the power button. The user can perform different operations based on a lasting time for which the power button is pressed or a quantity of times the power button is pressed. For example, the user may perform a power-off operation by pressing the power button for a lasting time that is up to 3 seconds, and the user may perform a restart operation by pressing the power button for a lasting time that is up to 10 seconds.

The radio communications unit 330 is responsible for a communication function of the electronic device. The radio communications unit 330 establishes a communications channel with a supportable mobile communications network to implement a voice call, a video conference, and data communication. The radio communications unit 330 includes a radio frequency (RF) transmitter and an RF receiver. The RF transmitter is configured to perform up-conversion and amplification on a transmitted signal. The RF receiver is configured to perform low noise amplification and down-conversion on a received signal. The radio communications unit 330 includes a cellular communications module (such as a third generation (3G) cellular communications module and/or a 4G cellular communications module) and a digital broadcast module.

The Global Positioning System (GPS) unit 390. The GPS unit 390 receives a satellite GPS signal from a GPS satellite, and transfers the GPS signal to the first processor 370. The first processor 370 is configured to calculate a current location of the electronic device based on the satellite GPS signal.

The sensing unit 350 is connected to the second processor 380, detects a change in location information of the electronic device 300 or a change in an ambient environment, and sends sensed information to the second processor 380. Specifically, the sensing unit 350 includes at least one of the following: a gyro sensor configured to detect a rotation, a rotation movement, an angular displacement, a tilt, or any other non-linear motion, a tri-axis acceleration sensor configured to sense acceleration in one or more directions, a barometer configured to measure a pressure altitude, an ambient light sensor configured to sense ambient light, and an infrared (IR) sensor and a proximity sensor that are configured to sense a gesture. The sensing unit 350 performs an operation under control of the second processor 380.

The electronic device 300 may receive motion sensor data generated by a motion sensor (such as the gyro sensor or the acceleration sensor) in the sensing unit 350, so as to generate a specific motion event (such as a walking event or a wobbling event) of the motion sensor data. The electronic device 300 may process the generated motion sensor data by using a motion sensing application. For example, a processor running the motion sensing application may analyze the motion sensor data, so as to distinguish a motion event of a specific type.

Optionally, the sensing unit 350 may be separately connected to the first processor 370 and the second processor 380. In this case, if the first processor 370 is in the active mode, the first processor 370 is directly connected to the sensing unit 350, so that the first processor 370 processes the sensed information. Otherwise, if the first processor 370 is in the power saving mode, the second processor 380 is directly connected to the sensing unit 350, so that the second processor 380 processes the sensed information.

The first processor 370 and the second processor 380 may be configured to communicate with each other by using an interface such as (but is not limited to) the following: one or more universal serial bus (USB) interfaces, a micro-USB interface, a universal asynchronous receiver/transmitter (UART) interface, and a general purpose input/output (GPIO) interface.

The electronic device 300 may further include another processor, and may be further implemented as that the first processor 370 and the second processor 380 are located in a dual-core chip, a multi-core chip, or the like on a single chip. To be specific, the first processor 370 and the second processor 380 are disposed in a same integrated circuit chip, or may be respectively disposed in different integrated circuit chips.

The storage unit 360 is configured to store various data that is executed and processed in the electronic device 300, and an operating system (OS) and various applications of the electronic device. The storage unit 360 is implemented by using at least one of the following: a RAM, a ROM, a flash memory, a volatile memory, an EPROM, and an EEPROM. The present invention is not limited thereto. The storage unit 360 includes a data area and a program area. The data area of the storage unit 360 stores data generated in the electronic device 300 and externally downloaded data.

The program area of the storage unit 360 stores an application program required for booting the operating system (OS), a navigation function, a video and audio playback function, and an image display function of the electronic device under control of the first processor 370. The program area is further configured to store an application program required by a broadcast and playback function, an audio recording function, a calculator function, a calendar function, and the like. For a description purpose, the storage unit 360 is shown in a manner of being separated from the first processor 370, and is located outside the first processor 370. However, in various embodiments, a part or all of the storage unit 360 may be integrated on a same integrated circuit as the first processor 370.

A storage area of the storage unit 360 further includes an extra storage area controlled by the second processor 380. Access to the extra storage area controlled by the second processor 380 is allowed even if the first processor 370 is in the power saving mode. The extra storage area controlled by the second processor 380 may be integrated on a same integrated circuit as the second processor 380. However, the present invention is not limited thereto.

The Bluetooth unit 340 is responsible for performing short range communication with another Bluetooth communications apparatus (such as a tablet computer or a smartphone). The Bluetooth unit 340 may be any hardware and/or software element configured to transmit (for example, send and/or receive) data by using one or more wired and/or wireless protocols. The Bluetooth unit 340 mainly transmits data by using a Bluetooth protocol.

The Bluetooth unit 340 is connected to the first processor 370 and the second processor 380. If the electronic device 300 is in the active mode, the first processor 370 directly communicates with the Bluetooth unit 340, so that the first processor 370 controls the Bluetooth unit 340. Otherwise, if the electronic device 300 is in the power saving mode, the second processor 380 directly communicates with the Bluetooth unit 340, so that the second processor 380 controls the Bluetooth unit 340.

Figure 4:
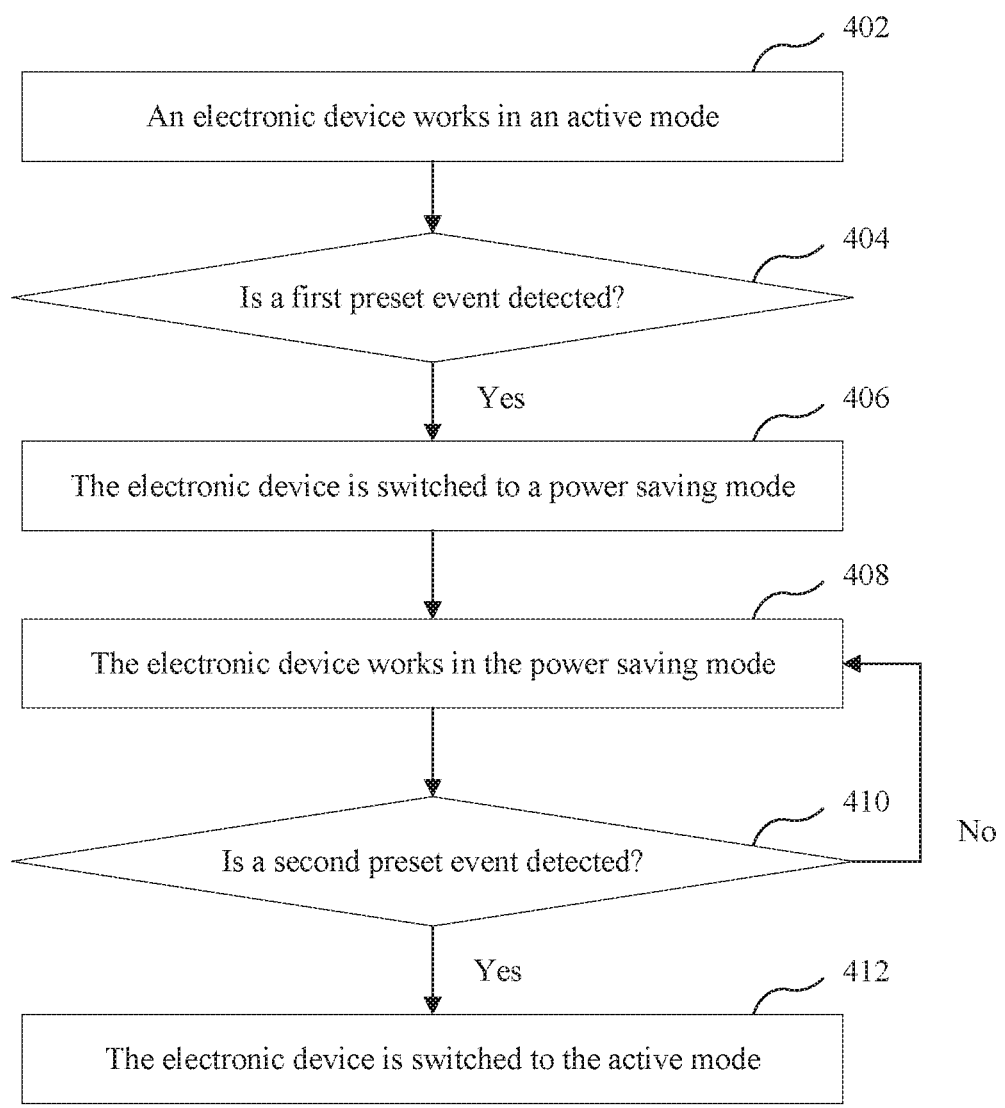
FIG. 4 is a flowchart of enabling a power saving mode for an electronic device according to an embodiment of this application.

FIG. 4 is a flowchart of enabling a power saving mode for an electronic device according to an embodiment of this application. A method in FIG. 4 may be applied to the electronic device 300 shown in FIG. 3.

After the electronic device 300 is powered on for the first time or is restarted, the electronic device 300 may start to work in an active mode. For example, in step 402, the electronic device 300 may work in the active mode. In some embodiments, when the electronic device 300 works in the active mode, a power supply supplies power to some or all of components of the electronic device 300. For example, in FIG. 3, the electronic device 300 may work in the active mode when a battery supplies power to the display unit 310, the input unit 320, the radio communications unit 330, the Bluetooth unit 340, the sensing unit 350, the storage unit 360, the first processor 370, the second processor 380, and the Global Positioning System (GPS) unit 390 by using a power management chip and a corresponding power line.

When the electronic device 300 works in the active mode, the first processor 370 may run one or more applications, such as an application loaded from the storage unit 360 into the first processor 370. As described above, the first processor 370 may be configured to run an operating system, an instant message application, a media playing application, a media editing application, or any other application.

At some moments, the electronic device 300 may be switched from the active mode to a power saving mode. In step 404, if the electronic device 300 detects a first preset event, the electronic device 300 is switched from the active mode to the power saving mode (step 406), and then the electronic device 300 works in the power saving mode (step 408). The first preset event includes at least one of the following: a quantity of electricity in the battery supplying power to the electronic device 300 reaches a battery electricity quantity threshold a temperature of the electronic device 300 reaches a specified temperature threshold; and the electronic device 300 receives a setting instruction entered by a user to enable the power saving mode.

In some embodiments, in the power saving mode, the electronic device 300 may stop supplying power to the first processor 370, or disable at least some cores of the first processor 370. For example, the first processor 370 has a plurality of cores, and a single-core mode may be set for the first processor 370.

For example, the electronic device 300 determines whether a quantity of remaining electricity in the battery is less than a predetermined value (for example, 8% of a whole battery capacity). When the quantity of remaining electricity in the battery is less than the predetermined value, the electronic device 300 is switched from the active mode to the power saving mode. However, this is merely an example.

In an implementation, when the quantity of remaining electricity in the battery is less than a first threshold (for example, 8% of the whole battery capacity), the electronic device generates a pop-up menu to prompt the user to enter a selection command for one of several menu options. Selecting an option of "enter the power saving mode" may enable the electronic device 300 to be switched from the active mode to the power saving mode. Selecting a menu option of "reject" allows the electronic device 300 to continue to be in the active mode.

In another implementation, when the quantity of remaining electricity in the battery is less than a second threshold (for example, 2% of the whole battery capacity), if the electronic device 300 has not entered the power saving mode (for example, when the quantity of remaining electricity in the battery is less than the first threshold, the user selects the menu option of "reject", and the electronic device 300 continues to be in the active mode), the electronic device 300 is switched from the active mode to the power saving mode. In this way, the electronic device can enter the power saving mode without confirmation of the user.

In some embodiments, after receiving the setting instruction entered by the user to enable the power saving mode, the electronic device 300 enters the power saving mode. For example, when the user directly touches a corresponding icon used to enable the "power saying mode", the electronic device 300 receives the setting instruction entered by the user to enable the power saving mode, to switch the electronic device 300 from the active mode to the power saving mode.

At some moments, the electronic device 300 may be switched from the power saving mode to the active mode. In step 410, if the electronic device 300 detects a second preset event, the electronic device 300 is switched from the power saving mode to the active mode (step 412). The second preset event includes at least one of the following: it is detected that the electronic device 300 is charged by using a power adapter; and the electronic device 300 receives a setting instruction entered by the user to exit the power saving mode. The electronic device 300 may be switched to the active mode when power input is detected on an input port (such as a micro-USB port or a Type-C port), or may be switched to the active mode when power input is sensed in a wireless charging manner.

The setting instruction entered by the user to exit the power saving mode may be triggered by tapping a corresponding icon, or may be triggered by using a button operation. For example, the electronic device 300 is in the power saving mode at the beginning, the user performs a restart operation by pressing a power button for a time period, and the electronic device 300 enters the active mode.

In some embodiments, when the battery of the electronic device 300 is charged by using an eternal source (such as the power adapter), the electronic device 300 is prohibited from entering the power saving mode. The power adapter may receive AC power from a wall plug, an in-vehicle charger, or another power source, and provide DC power used to charge the battery. For example, when the battery of the electronic device 300 is charged by using the power adapter, GUI display of the electronic device is modified, for example, an icon button corresponding to the "power saving mode" is grayed, so as to prohibit selection of a "power saving mode" option. For another example, when the battery of the electronic device 300 is charged by using the power adapter, when the setting instruction entered by the user to enable the power saving mode is received, the setting instruction is discarded, and an operation of performing switching from the active mode to the power saving mode is not performed.

In some embodiments, the battery of the electronic device 300 may be wirelessly charged in a wireless charging manner. Wireless charging technologies may be roughly classified into an electromagnetic induction solution using a coil, a resonance solution using a resonance, and a radio frequency (RF)/microwave radiation solution in which electric energy is transferred by converting the electric energy into a microwave. A distance between a wireless power transmitter and a wireless power receiver is relatively small (for example, is 10 centimeters or shorter) in the electromagnetic induction solution. However, when the resonance solution or the microwave radiation solution is used, a distance between the wireless power transmitter and the wireless power receiver may be up to tens of meters. For example, an electronic device having a capability to receive induction electric energy may be placed near a transmitter generating induction electric energy. In these systems, a transmitting coil in the transmitter may generate a time-varying magnetic flux, so that a current can be induced in a receiving coil in the electronic device. A received current may be used by the electronic device to supplement a charge of the battery.

Figure 5:
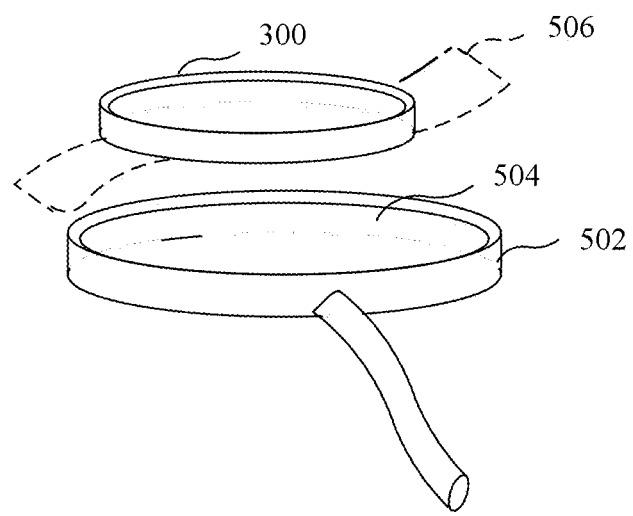
FIG. 5 is a schematic diagram of wirelessly charging an electronic device according to an embodiment of this application.

As shown in FIG. 5, an induction electric energy receiver is disposed on a lower surface of the electronic device 300, and may be aligned with an interface surface 504 of an induction electric energy transmitter 502, or may be in contact with an interface surface 504 in another manner. In this way, the induction electric energy receiver and the induction electric enemy transmitter 504 may be in contact with each other. The electronic device 300 may include a watch band 506 attached to the main body.

Optionally, an induction electric energy transmitter device and a receiver device may be placed opposite to each other by using one or more alignment mechanisms. In an example, one or more magnetic devices may be included in the transmitter device and/or the receiver device, and may be configured to align the transmitter device and the receiver device opposite to each other.

Figure 6:
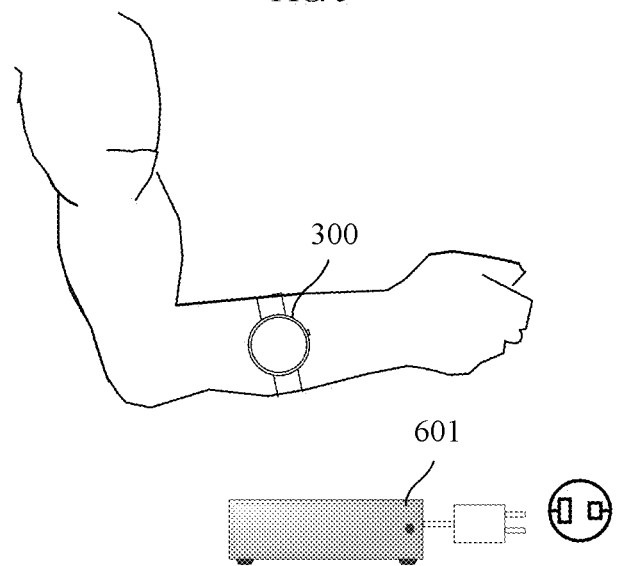
FIG. 6 is a schematic diagram of wirelessly charging an electronic device according to another embodiment of this application.

Referring to FIG. 6, a wireless power transmitter 601 supplies a wireless power source to a wireless power receiver (namely, the electronic device 300) in an electromagnetic wave form by using a resonance solution or a microwave radiation solution. In addition, the wireless power transmitter 601 may send the wireless power source to a plurality of wireless power receivers.

The electronic device 300 receives wireless power from the wireless power transmitter 601, and charges the battery installed in the electronic device 300. The electronic device 300 sends, to the wireless power transmitter 601, at least one of a signal used to request to transfer wireless power, information required for receiving wireless power, and status information of the electronic device 300. The wireless power transmitter 601 performs a charging operation on the electronic device 300 placed in a charging area (to be specific, the electronic device 300 is located within an effective distance to the charging area of the wireless power transmitter 601) of the wireless power transmitter 601.

In FIG. 6, the electronic device 300 is worn on a user's body (for example, on a wrist), the electronic device 300 is located in the charging area of the wireless power transmitter 601, and the electronic device 300 receives wireless power from the wireless power transmitter 601, and charges the battery installed in the electronic device 300. In this case, the user can complete charging without a need to take the electronic device 300 off. When the electronic device 300 is worn on the user's body, and the electronic device 300 is charged by using the wireless power transmitter, the electronic device 300 is prohibited from entering the power saving mode. When the electronic device is worn on the user's body and is charged in a wireless charging manner, the user usually needs to use various functions (such as a calling function and a function of receiving a notification message from another electronic device (such as a mobile phone) by using Bluetooth) of the electronic device. In this case, the electronic device is prohibited from entering the power saving mode, thereby preventing the user from missing a relatively important incoming call and notification message during charging.

Figure 7:
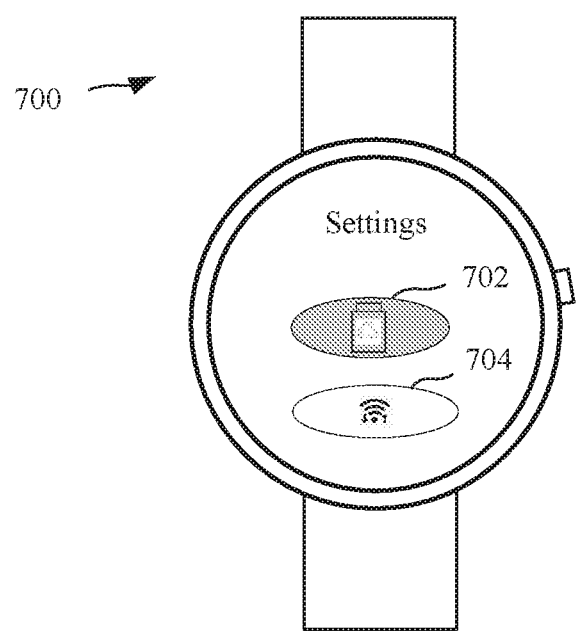
FIG. 7 is a schematic diagram of an interface in which an electronic device enters a power saving mode in a charging state according to an embodiment of this application.

In an implementation, as shown in FIG. 7, the electronic device 300 is operated in the active mode. When the battery of the electronic device 300 is charged by using the induction electric energy transmitter 502 in FIG. 5, a "power saving mode" button 702 displayed by the display unit is in a prohibited state, to be specific, the icon button 702 corresponding to the "power saving mode" is in a grayed state, so that the user is prohibited from selecting a "power saving mode" option. "WLAN" button 704 displayed by the display unit is in an enabled state, and the user may tap the "WLAN" button 704 to enter a wireless local area network configuration interface.

In another implementation, as shown in FIG. 7, the electronic device 300 is operated in the active mode. When it is determined that the electronic device 300 is attached to the user, and that the electronic device 300 is charged by using the wireless power transmitter 601 in FIG. 6, a "power saving mode" button 702 displayed by the display unit of the electronic device 300 is in a prohibited state, to be specific, the icon button 702 corresponding to the "power saving mode" is in a grayed state, so that the user is prohibited from selecting a "power saving mode" option, and accordingly the electronic device 300 is prohibited from entering the power saving mode.

When the battery is charged by using an external source, the electronic device 300 is prohibited from entering the power saving mode, and the electronic device 300 in the active mode may execute various functions (such as a calling function and a function of receiving a notification message from another electronic device (such as a mobile phone) by using Bluetooth), thereby preventing the user from missing a relatively important incoming call and notification message during charging.

After the electronic device 300 enters the power saving mode, the second processor 380 of the electronic device 300 may receive motion sensor data generated by a motion sensor in the sensing unit 350, so as to generate specific motion information (such as step quantity information) of the motion sensor data, and store the step quantity information into an extra storage area that is in the storage unit 360 and that is controlled by the second processor 380. After the electronic device 300 enters the power saving mode, if the electronic device 300 is restarted (for example, a restart operation is performed by pressing a power button for a time period, or a restart operation is performed when the battery of the electronic device 300 is charged by using the power adapter), the first processor 370 of the electronic device 300 obtains, from the second processor 380, the step quantity information of the electronic device 300 in the power saving mode.

After the electronic device 300 enters the power saving mode, the motion sensor in the sensing unit 350 generates motion data, and detects whether the user performs a wrist raising action. When the wrist raising action of the user is detected, the second processor 380 controls lighting of the display unit of the electronic device (enables backlight of the display unit of the electronic device).

If the battery of the electronic device 300 is charged by using the power adapter, the electronic device 300 is restarted and is switched from the power saving mode to the active mode. After the electronic device 300 is restarted, the electronic device 300 enters the active mode. The electronic device 300 in the active mode may execute various functions (such as a calling function and a function of receiving a notification message from another electronic device (such as a mobile phone) by using Bluetooth), thereby preventing the user from missing a relatively important incoming call and notification message during charging.

Figure 8:
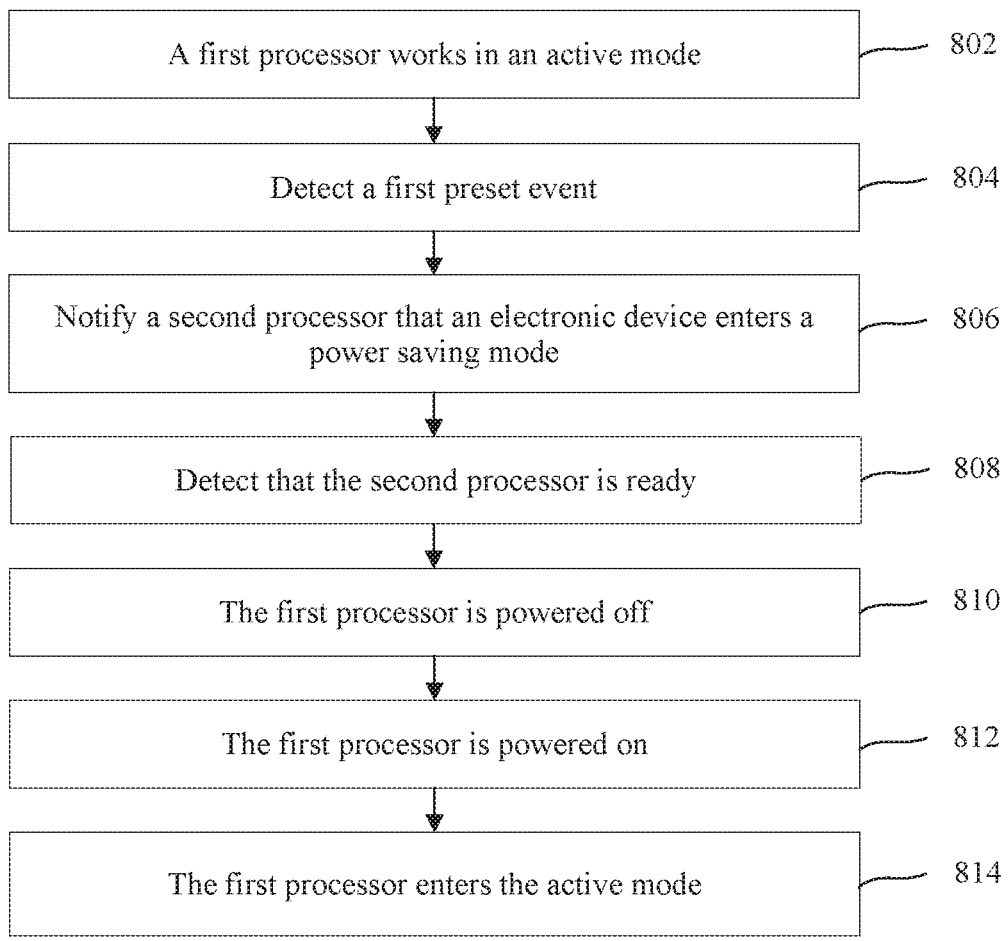
FIG. 8 is an operation flowchart of a first processor of an electronic device configured to reduce power consumption according to an embodiment of this application.

The first processor 370 performs the following operations. Referring to FIG. 8, in step 802, the first processor works in the active mode. When the electronic device is in the active mode, the first processor 370 controls the peripheral hardware (such as the Bluetooth unit 340, the input unit 320, and the display unit 310) associated with the local bus of the first processor. Specifically, the first processor 370 in the active mode is configured to perform at least one of the following: communicating with the Bluetooth unit 340 to process Bluetooth communication data; controlling a power-on operation, a power-off operation, a screen lighting operation, and a restart operation of the electronic device 300 by using the input unit 320; and controlling the display unit 310 by using a mobile industry processor interface (MIPI). For example, the electronic device 300 in the active mode may receive, by using the Bluetooth unit 340, an event such as a phone call or a message sent by another electronic apparatus (such as a mobile phone or a tablet computer), and provide a notification service of instructing the user to receive the event. The electronic device 300 in the active mode may support local area network communication, voice, data communication, and cellular phone communication by using the radio communications unit 330, and obtain geographical location information of the electronic device 300 by using the Global Positioning System (GPS) unit.

In step 804, if the first processor 370 detects a first preset event, the electronic device 300 is switched from the active mode to the power saving mode. The first preset event includes at least one of the following: a quantity of electricity in the battery supplying power to the electronic device 300 reaches a battery electricity quantity threshold; a temperature of the electronic device 300 reaches a specified temperature threshold; and the electronic device 300 receives a setting instruction entered by the user to enable the power saving mode.

If the first preset event is detected, in step 806, the first processor 370 notifies the second processor 380 that the electronic device 300 is to enter the power saving mode. Specifically, the first processor 370 may notify, by using a UART interface or an SPI interface, the second processor 380 that the electronic device 300 is to enter the power saving mode. After receiving a notification that the electronic device 300 is to enter the power saving mode, the second processor 380 makes some preparations, for example, disconnecting the first processor 370 from the input unit 320 (such as the power button), and taking the place of the first processor 370 to control the input unit 320.

In step 808, if the first processor 370 detects that the second processor 380 is ready, the first processor 370 is powered off in step 810. The first processor 370 is operated in the power saving mode, and power consumed by the electronic device 300 is minimized in the power saving mode. After the first processor 370 is powered off, to maintain some necessary functions (such as a step count function and a clock function) of the electronic device 300, the peripheral hardware associated with the local bus of the first processor 370 may be controlled by using the second processor 380. The second processor 380 in the power saving mode is configured to perform at least one of the following: communicating with the Bluetooth unit 340 to process Bluetooth communication data; controlling a power-on operation, a power-off operation, a screen lighting operation, and a restart operation of the electronic device 300 by using the input unit 320; and controlling the display unit 310 by using the serial peripheral interface (SPI). For example, the electronic device 300 in the active mode may receive, by using the Bluetooth unit 340, an event such as a phone call or a message sent by another electronic apparatus (such as a mobile phone or a tablet computer), and provide a notification service of instructing the user to receive the event. The electronic device 300 in the power saving mode cannot support local area network communication, voice, data communication, and cellular phone communication by using the radio communications unit 330, and also cannot obtain geographical location information of the electronic device 300 by using the Global Positioning System (GPS) unit. After the first processor 370 is powered off, the second processor 380 detects that the first processor 370 is powered off, and the second processor 380 initializes the display unit 310 and the Bluetooth unit 340.

In step 812, when the first processor 370 is powered on, the electronic device 300 performs a restart operation, the first processor 370 is switched to the active mode (step 814), and the electronic device 300 also enters the active mode.

Figure 9:
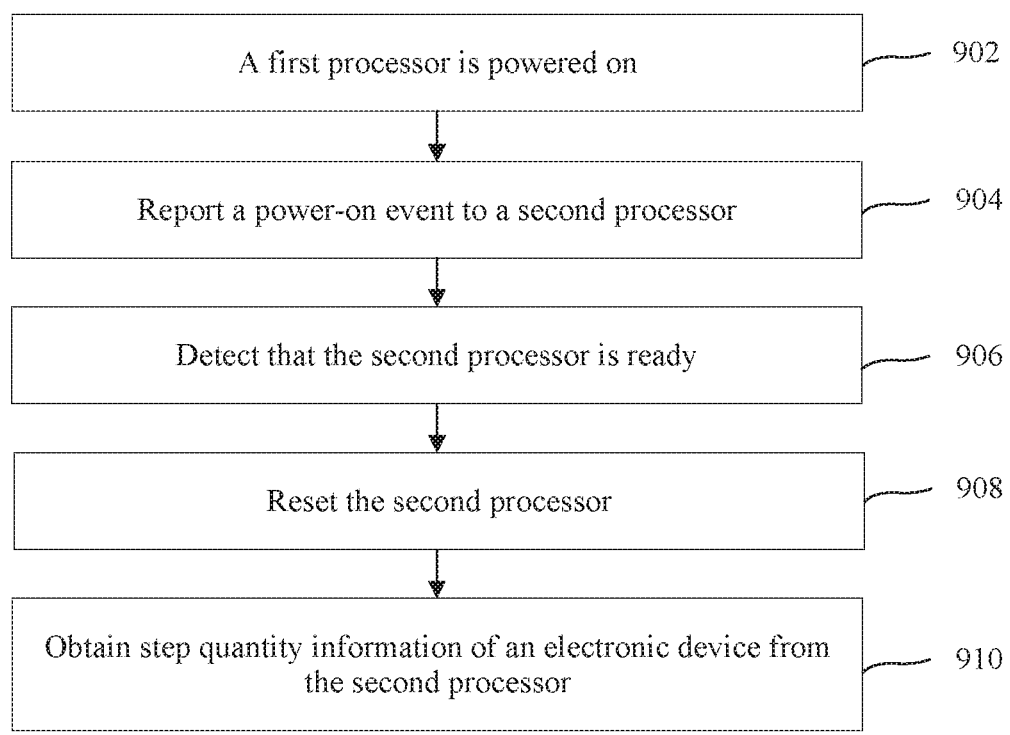
FIG. 9 is an operation flowchart of a first processor of an electronic device that is charged after entering a power saving mode according to an embodiment of this application.

Specifically, referring to FIG. 9, in step 902, when the electronic device 300 is charged by using the power adapter, the first processor 370 is powered on.

In step 904, the first processor 370 reports a power-on event to the second processor 380. Then, the second processor 380 stores motion data (such as step quantity information) into the extra storage area that is in the storage unit 360 and that is controlled by the second processor 380, and the second processor 380 disables the display unit 310. In this case, the second processor is ready.

In step 906, the first processor 370 detects that the second processor 380 is ready, and the first processor 370 resets the second processor 380 (step 908). Specifically, the first processor 370 may determine, by detecting that a voltage on a configuration pin is pulled up or down, whether the first processor is ready. For example, after the second processor 380 is ready, a voltage on a configuration pin of the second processor 380 is pulled up. If the first processor 370 detects that a level of the configuration pin of the second processor is a high level, it indicates that the second processor 380 is ready.

In step 910, the first processor 370 obtains the step quantity information of the electronic device 300 from the second processor 380.

Figure 10:
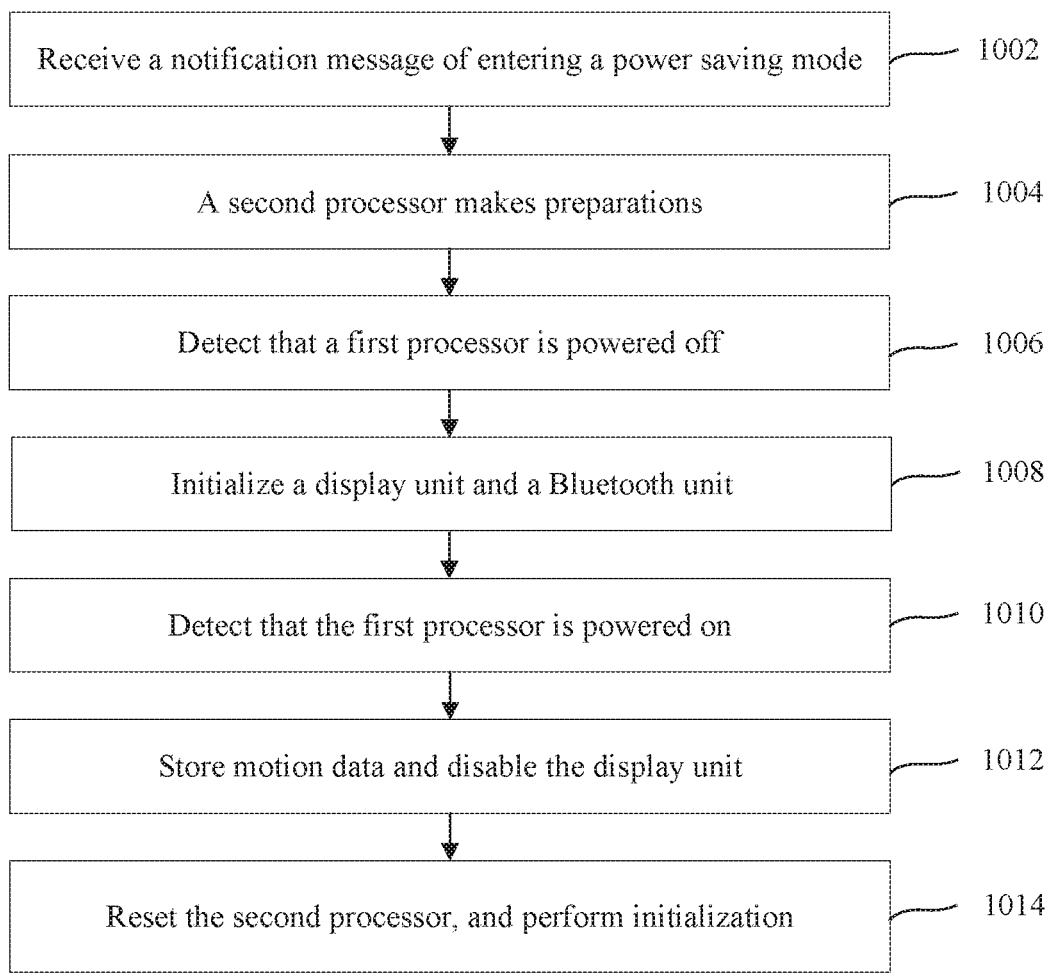
FIG. 10 is an operation flowchart of a second processor of an electronic device configured to reduce power consumption according to an embodiment of this application.

The second processor 380 performs the following operations. Referring to FIG. 10, in step 1002, the second processor 380 receives a notification message that the first processor 370 enters the power saving mode. After detecting a first preset event, the first processor 370 notifies the second processor 380 that the electronic device 300 is to enter the power saving mode. The first preset event includes at least one of the following: a quantity of electricity in the battery supplying power to the electronic device 300 reaches a battery electricity quantity threshold; a temperature of the electronic device 300 reaches a specified temperature threshold; and the electronic device 300 receives a setting instruction entered by the user to enable the power saving mode.

In step 1004, the second processor 380 makes some preparations, for example, disconnecting the first processor 370 from the input unit 320 (such as the power button), and taking the place of the first processor 370 to control the input unit 320. After preparing to control the input unit 320, the second processor notifies the first processor 370 that the second processor is ready.

In step 1006, the second processor 380 detects that the first processor 370 is powered off, the second processor 380 initializes the display unit 310 and the Bluetooth unit 340 (step 1008), and then the electronic device 300 enters the power saving mode. Specifically, the second processor 380 may determine, by detecting that a voltage on a configuration pin is pulled up or down, whether the first processor is powered off. In the power saving mode, after the first processor 370 is powered off, to maintain some necessary functions (such as a step count function and a clock function) of the electronic device 300, peripheral hardware associated with a local bus of the first processor 370 may be controlled by using the second processor 380. The second processor 380 in the power saving mode is configured to perform at least one of the following: communicating with the Bluetooth unit 340 to process Bluetooth communication data; controlling a power-on operation, a power-off operation, a screen lighting operation, and a restart operation of the electronic device 300 by using the input unit 320; and controlling the display unit 310 by using the serial peripheral interface (SPI). For example, the electronic device 300 in the power saving mode may receive, by using the Bluetooth unit 340, an event such as a phone call or a message sent by another electronic apparatus (such as a mobile phone or a tablet computer), and provide a notification service of instructing the user to receive the event. The electronic device 300 in the power saving mode cannot support local area network communication, voice, data communication, and cellular phone communication by using the radio communications unit 330, and also cannot obtain geographical location information of the electronic device 300 by using the Global Positioning System (GPS) unit.

In step 1010, when the second processor 380 detects that the first processor 370 is powered on, the electronic device 300 performs a restart operation, and the electronic device 300 is switched to the active mode. Specifically, when the battery of the electronic device 300 is charged the using the power adapter, the first processor 370 is powered on, and the first processor 370 reports a power-on event to the second processor 380. In step 1012, the second processor 380 stores motion data (such as step quantity information) into the extra storage area that is in the storage unit 360 and that is controlled by the second processor 380 and the second processor 380 disables the display unit 310. Then, in step 1014, the second processor is reset and performs initialization. Specifically, the second processor 380 performs initialization after detecting a reset signal from the first processor 370. The first processor 370 obtains, from the second processor 380, the step quantity information of the electronic device 300 in the power saving mode.

The processor configured to perform the embodiments of this application may be a general purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various examples of logical blocks, modules, and circuits that are described with reference to content disclosed in this application. Alternatively, the processor may be a combination of processors for implementing a calculation function, for example, a combination including one or more microprocessors or a combination of a DSP and a microprocessor.

Method or algorithm steps described in combination with the content disclosed in this application may be implemented by hardware, or may be implemented by the processor by executing a software instruction. The software instruction may be formed by a corresponding software module. The software module may be stored in a RAM memory, a flash memory, a ROM memory, an EPROM memory, an EEPROM memory, a register, a hard disk, a removable magnetic disk, a CD-ROM, or a storage medium of any other form known in the art. For example, a storage medium is coupled to the processor, so that the processor can read information from the storage medium and can write information into the storage medium. Certainly, the storage medium may be a component of the processor. The processor and the storage medium may be located in the ASIC. In addition, the ASIC may be located in user equipment. Certainly, the processor and the storage medium may exist in the user equipment as discrete components.

A person skilled in the art should be aware that in the foregoing one or more examples, functions described in this application may be implemented by hardware, software, firmware, or any combination thereof. A person of ordinary skill in the art should easily be aware that, in combination with the examples described in the embodiments disclosed in this specification, units, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application. When the present invention is implemented by software, the foregoing functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium accessible to a general purpose or dedicated computer.

The objectives, technical solutions, and beneficial effects of this application are further described in detail in the foregoing specific embodiments. It should be understood that the foregoing descriptions are merely specific implementations of this application, but are not intended to limit the protection scope of this application. Any modification, equivalent replacement, or improvement made based on the technical solutions of this application shall fall within the protection scope of this application.

What is claimed is:

1. An electronic device, comprising:

a first processor configured to be powered off in response to the electronic device being in a power saving mode; and a second processor coupled to the first processor and configured to control peripheral hardware associated with a local bus in response to the electronic device being in the power saving mode, wherein the peripheral hardware comprises at least one of a display, an input, a Bluetooth® receiver, or a sensor, and wherein the electronic device supports a function of displaying step count information in the power saving mode, wherein, in response to the electronic device being in the power saving mode and being charged using a power adapter, the electronic device restarts and the first processor is further configured to:

power on and switch the electronic device to an active mode; and prohibit a user from causing the electronic device to enter the power saving mode by prohibiting selection of a displayed power saving mode option in response to the electronic device being in the active mode and being charged using the power adapter.

2. The electronic device of claim 1, wherein the electronic device further comprises a mobile industry processor interface (MIPI), and wherein the first processor is further configured to control, using the MIPI, the display in response to the electronic device being in the active mode.

3. The electronic device according to claim 1, wherein the electronic device further comprises a serial peripheral interface (SPI), and wherein the second processor is further configured to control, using the SPI, the display in response to the electronic device being in the power saving mode.

4. The electronic device of claim 1, wherein the electronic device further comprises the display, and wherein the displayed power saving mode option is displayed on the display.

5. The electronic device of claim 1, wherein the second processor is further configured to enable a backlight of the display in response to the electronic device being in the power saving mode and in response to detecting a wrist raising action of the user.

6. The electronic device of claim 1, wherein the second processor is further configured to control a battery electricity quantity of the electronic device in response to the battery electricity quantity of the electronic device reaching a battery electricity quantity threshold by controlling the peripheral hardware.

7. The electronic device of claim 4, wherein prohibiting selection of the displayed power saving mode option comprises disabling the displayed power saving mode option.

8. The electronic device of claim 4, wherein the second processor is further configured to restart the electronic device in response to detecting a charging event in the power saving mode.

9. The electronic device of claim 1, wherein the electronic device is a wearable device.

10. The electronic device of claim 7, wherein disabling the displayed power saving mode option comprises graying out the displayed power saving mode option on the display.

11. The electronic device of claim 1, wherein the first processor is further configured to obtain step count information from the second processor in response to the electronic device changing from the power saving mode to the active mode.

12. The electronic device of claim 1, wherein the second processor is further configured to control, in response to a temperature of the electronic device reaching a specified temperature threshold, the temperature by controlling the peripheral hardware.

13. The electronic device of claim 1, wherein the second processor is further configured to enable the power saving mode in response to receiving a setting instruction from the user.

14. A method performed by an electronic device, the method comprising:

operating the electronic device in an active mode;

switching a mode of the electronic device from the active mode to a power saving mode in response to detecting a first preset event, wherein a first processor of the electronic device is powered off while the electronic device is in the power saving mode;

controlling, by a second processor of the electronic device while the electronic device is in the power saving mode, peripheral hardware associated with a local bus, wherein the peripheral hardware comprises at least one of a display, an input, a Bluetooth® receiver, or a sensor, and wherein the electronic device supports a function of displaying step count information in the power saving mode;

in response to the electronic device being in the power saving mode and being charged using a power adapter:

restarting the electronic device;

powering on, by the first processor, the electronic device; and switching the electronic device to the active mode;

prohibiting, by the first processor, a user from causing the electronic device to enter the power saving mode by prohibiting selection of a displayed power saving mode option in response to the electronic device being in the active mode and being charged using the power adapter.

15. The method of claim 14, further comprising enabling a backlight of the display in response to the electronic device operating in the power saving mode and detecting a wrist raising action of the user.

16. The method of claim 14, wherein the electronic device is a wearable device.

17. The method of claim 14, further comprising restarting the electronic device after the electronic device enters the power saving mode and in response to the electronic device being charged using the power adapter.

18. The method of claim 14, wherein the first preset event comprises at least one of the following:

a battery electricity quantity of the electronic device reaching a battery electricity quantity threshold;

a temperature of the electronic device reaching a specified temperature threshold; or receiving a setting instruction from the user to enable the power saving mode.

19. The method of claim 14, further comprising obtaining, by the second processor, step count information in response to the electronic device changing from the power saving state to an active state.

20. The method of claim 14, further comprising controlling, using a serial peripheral interface (SPI) of the electronic device, the display in response to the electronic device being in the power saving mode.

* * * * *